(12) United States Patent
Surridge et al.

(10) Patent No.: US 9,774,737 B2
(45) Date of Patent: *Sep. 26, 2017

(54) SYSTEM AND METHOD FOR CUSTOMER EXPERIENCE MANAGEMENT

(71) Applicant: Genesys Telecommunications Laboratories, Inc., Daly City, CA (US)

(72) Inventors: Matthew J. Surridge, Melbourne (AU); Andrew T. C. Verrall, Melbourne (AU); Cameron David Smith, Melbourne (AU); Gregory J. Hedges, Sydney (AU); Merijn te Booij, Burlingame (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,501

(22) Filed: Jul. 11, 2016

(65) Prior Publication Data

US 2016/0323447 A1 Nov. 3, 2016

Related U.S. Application Data

(63) Continuation of application No. 14/141,405, filed on Dec. 26, 2013, now Pat. No. 9,392,116.

(51) Int. Cl.
| | |
|---|---|
| *H04M 3/51* | (2006.01) |
| *H04M 3/523* | (2006.01) |
| *G06Q 10/06* | (2012.01) |

(52) U.S. Cl.
CPC .. *H04M 3/5175* (2013.01); *G06Q 10/063112* (2013.01); *H04M 3/5233* (2013.01); *H04M 2203/401* (2013.01)

(58) Field of Classification Search
CPC ........ G06Q 10/063112; H04M 3/5233; H04M 3/5175; H04M 2203/401

(Continued)

(56) References Cited

U.S. PATENT DOCUMENTS

| | | |
|---|---|---|
| 6,832,203 B1 | 12/2004 | Villena |
| 8,527,310 B1 | 9/2013 | Capetz et al. |

(Continued)

OTHER PUBLICATIONS

I. Gurvich et al., "Cross-Selling in a Call Center with a Heterogeneous Customer Population", Operations Research, vol. 57, No. 2, Mar.-Apr. 2009, pp. 299-313.

(Continued)

*Primary Examiner* — Harry S Hong
(74) *Attorney, Agent, or Firm* — Lewis Roca Rothgerber Christie LLP

(57) ABSTRACT

A system and method for managing a customer's experience with a contact center that takes available data about the customer, the agents of the contact center, and the organization represented by the contact center, for identifying opportunities for additional conversations/interactions with the customer and engaging in those additional conversations/interactions at a time and with a resource predicted to maximize outcomes for the organization. A processor is configured to identify express and/or implied intents for an interaction between the customer and the contact center. A business goal related to the express and/or implied intents is also identified for determining a current performance of the contact center and for identifying any performance gaps. Contact center targets are identified based on their performance in handling the express and/or implied intents, and the identified performance gaps. An available one of the identified targets is then selected for routing the interaction to the target.

34 Claims, 24 Drawing Sheets

(58) Field of Classification Search
USPC .............. 379/265.01–265.08, 265.11–265.14
See application file for complete search history.

(56) References Cited

U.S. PATENT DOCUMENTS

| | | | |
|---|---|---|---|
| 9,392,116 B2* | 7/2016 | Surridge | ........ G06Q 10/063112 |
| 2006/0245580 A1 | 11/2006 | Hein et al. | |
| 2007/0195945 A1 | 8/2007 | Korenblit et al. | |
| 2008/0112557 A1 | 5/2008 | Ricketts | |
| 2009/0323921 A1 | 12/2009 | Spottiswoode et al. | |
| 2009/0327051 A1 | 12/2009 | Nerby | |
| 2010/0111285 A1 | 5/2010 | Chishti | |
| 2011/0185293 A1 | 7/2011 | Barnett et al. | |
| 2012/0300920 A1 | 11/2012 | Fagundes et al. | |
| 2013/0077768 A1 | 3/2013 | Pearce et al. | |
| 2013/0282430 A1 | 10/2013 | Kannan et al. | |
| 2014/0307863 A1 | 10/2014 | Snyder et al. | |
| 2015/0117632 A1 | 4/2015 | Konig et al. | |

OTHER PUBLICATIONS

International Search Report and Written Opinion of the International Searching Authority for patent application No. PCT/US/2014/072297, dated Apr. 13, 2015, 14 pages.

L. Brown et al., "Statistical Analysis of a Telephone Call Center: A Queueing-Science Perspective", White Paper, Nov. 9, 2002, 59 pages.

M. Armony et al., "When Promotions Meet Operations: Cross-Selling and its Effect on Call-Center Performance", White Paper, Jul. 27, 2006, 41 pages.

Australian Government Examination Report No. 1 for Application No. 2014369897, dated Feb. 7, 2017, 4 pages.

Supplementary European Search Report for Application No. 14875141.5, dated Dec. 20, 2016, 8 pages.

Canadian Intellectual Property Office Action for Application No. 2,935,389, dated May 31, 2017, 5 pages.

* cited by examiner

FIG. 2A

| 1st AGENT | Avg. Meaningful Attribute Calculation | NPS Score | Resolution Resolved % |
|---|---|---|---|
| 37268342 | 40,000 | 100.00 | 100.00% |
| 37275024 | 33,333 | 66.67 | 100.00% |
| 37338582 | 6,400 | -60.00 | 80.00% |
| 38120796 | 8,889 | -33.33 | 66.67% |
| 38225619 | 26,667 | 33.33 | 100.00% |
| 39299695 | 5,000 | -50.00 | 50.00% |
| 39464902 | 4,444 | -66.67 | 66.67% |

FIG. 3

Meaningful Attribute Calculation (Groups)

| | Group 1 | Group 2 | Group 3 | Group 4 | Group 5 | Group 6 | Group 7 | Group 8 | Group 9 | Group 10 | Grand Total |
|---|---|---|---|---|---|---|---|---|---|---|---|
| % of Total CALLS along T... | 2.76% | 1.98% | 7.04% | 20.10% | 24.27% | 9.57% | 9.32% | 13.52% | 6.44% | 4.98% | 100.00% |
| Total Interactions | 3,209 | 2,304 | 8,173 | 23,349 | 28,188 | 11,121 | 10,829 | 15,703 | 7,483 | 5,789 | 116,148 |
| Resolution Resolved % | 54.73% | 59.41% | 67.93% | 73.68% | 83.23% | 86.20% | 94.77% | 97.04% | 98.51% | 99.84% | 88.67% |
| NPS Score | 78.16 | -42.22 | -19.91 | -2.88 | 11.05 | 30.22 | 38.62 | 55.15 | 69.83 | 96.79 | 34.29 |
| % of Total Agent Count alo... | 12.71% | 4.66% | 8.44% | 12.85% | 25.07% | 8.00% | 15.13% | 17.31% | 9.80% | 26.62% | 100.00% |
| Number of Staff | 262 | 96 | 174 | 265 | 517 | 165 | 312 | 357 | 202 | 549 | 2,062 |
| Calculated Work Hours | 465 | 290 | 857 | 2,314 | 2,949 | 1,216 | 1,465 | 2,036 | 1,017 | 914 | 13,525 |
| Average Handle Time | 522 | 453 | 378 | 357 | 377 | 393 | 487 | 467 | 469 | 569 | 419 |
| Avg. Hold Duration | 54 | 39 | 21 | 18 | 24 | 30 | 40 | 34 | 33 | 64 | 30 |
| Avg. Talk Duration | 417 | 383 | 335 | 325 | 331 | 337 | 390 | 379 | 392 | 433 | 355 |
| Avg. Customer Wait Time | 300 | 346 | 268 | 246 | 243 | 291 | 297 | 226 | 242 | 280 | 260 |
| Avg. Balance at Call | $660.02 | $550.20 | $592.51 | $594.41 | $587.73 | $581.30 | $494.30 | $426.04 | $412.83 | $566.31 | $544.89 |
| Total Transfers | 601 | 443 | 1,616 | 5,278 | 6,118 | 2,282 | 1,459 | 1,502 | 621 | 754 | 20,674 |
| Transfer Percentage | 18.73% | 19.23% | 19.77% | 22.60% | 21.70% | 20.52% | 13.47% | 9.57% | 8.30% | 13.02% | 17.80% |

FIG. 4A

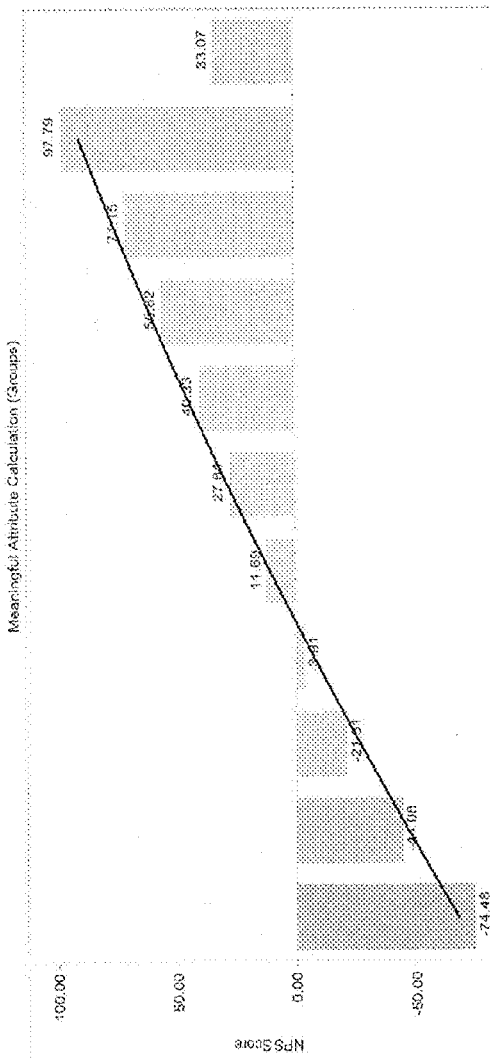
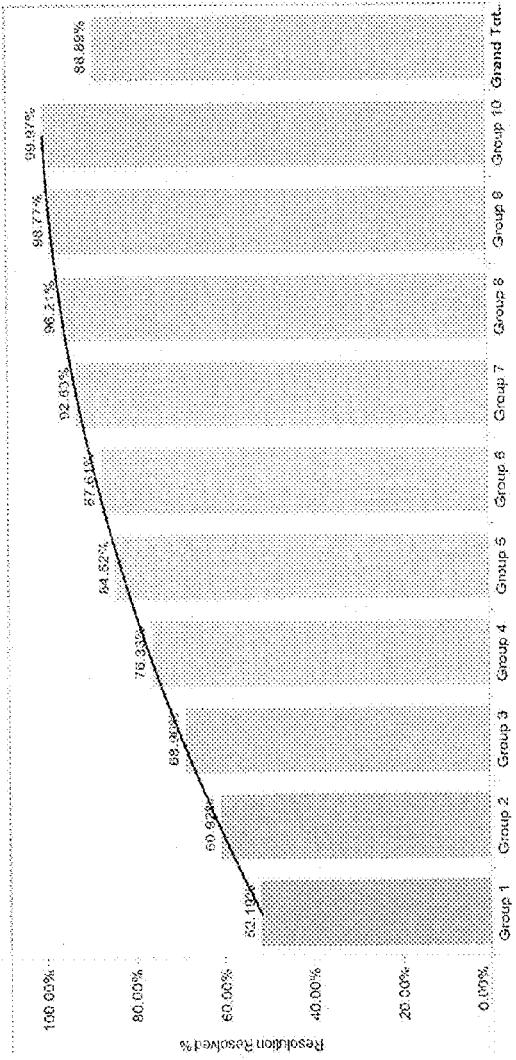
FIG. 4B
FIG. 4C

| | In / Out of Groups 5 - 10 | | |
| --- | --- | --- | --- |
| | In | Out | Grand Total |
| % of Total CALLS along T.. | 82.81% | 17.19% | 100.00% |
| Total Interactions | 441,597 | 91,669 | 533,266 |
| Resolution Resolved % | 91.58% | 70.66% | 88.89% |
| NPS Score | 40.59 | -18.87 | 33.07 |
| % of Total Agent Count alo.. | 88.45% | 44.15% | 100.00% |
| Number of Staff | 6,218 | 3,104 | 7,030 |
| Calculated Work Hours | 98,739 | 17,231 | 115,970 |
| Average Handle Time | 805 | 677 | 783 |
| Avg. Hold Duration | 103 | 92 | 101 |
| Avg. Talk Duration | 591 | 513 | 578 |
| Avg. Customer Wait Time | 218 | 248 | 222 |
| Avg. Balance at Call | $306.55 | $419.85 | $325.23 |
| Total Transfers | 59,224 | 16,549 | 75,773 |
| Transfer Percentage | 13.41% | 18.05% | 14.21% |

FIG. 4D

In / Out of Groups 4 - 10

| | In | Out | Grand Tot.. |
|---|---|---|---|
| % of Total CALLS along T.. | 92.05% | 7.95% | 100.00% |
| Total Interactions | 490,888 | 42,378 | 533,266 |
| Resolution Resolved % | 90.41% | 63.34% | 88.89% |
| NPS Score | 37.23 | -38.32 | 33.07 |
| % of Total Agent Count alo.. | 92.13% | 32.15% | 100.00% |
| Number of Staff | 6,477 | 2,260 | 7,030 |
| Calculated Work Hours | 107,691 | 8,279 | 115,970 |
| Average Handle Time | 790 | 703 | 783 |
| Avg. Hold Duration | 101 | 100 | 101 |
| Avg. Talk Duration | 582 | 523 | 578 |
| Avg. Customer Wait Time | 220 | 258 | 222 |
| Avg. Balance at Call | $321.08 | $377.69 | $325.23 |
| Total Transfers | 68,255 | 7,518 | 75,773 |
| Transfer Percentage | 13.90% | 17.74% | 14.21% |

FIG. 4E

Global Settings

Goal Period · · · · · · · · · · · · · · · · · 1 Month

Goals · · · · · · · · · · · · Revenue · · · · · · · · · · 1,000,000
· · · · · · · · · · · · · · · Customer Experience · · · · 43 NPS Channels · · · · · · · · Voice · · · · · · RP
· · · · · · · · · · · · · Chat · · · · · · · RP
· · · · · · · · · · · · · Mobile · · · · · · RP
· · · · · · · · · · · · · Social · · · · · · R R=Reactive
P=Proactive
NA=Not Used

| Intention Group | | |
|---|---|---|
| Goal | SALES | REVENUE |
| Revenue | 800,000 | |
| Customer Experience | 55 NPS | |
| Channels | | |
| Voice | RP | |
| Chat | RP | |
| Mobile | NA | |
| Social | R | |

FIG. 7B

| Product Lines or Business Units | | |
|---|---|---|
| Mobile | Revenue | 300,000 |
| | Customer Exp | 55 NPS |
| Channels | Voice | RP |
| | Chat | RP |
| | Mobile | NA |
| | Social | NA |

| Product Lines or Business Units | | |
|---|---|---|
| Broad Band | Revenue | 500,000 |
| | Customer Exp | 55 NPS |
| Channels | Voice | RP |
| | Chat | RP |
| | Mobile | NA |
| | Social | NA |

| Mobile Sales New | Revenue | 200,000 |
|---|---|---|
| | Customer Experience | 55 NPS |
| Channels | | |
| | Voice | RP |
| | Chat | RP |
| | Mobile | NA |
| | Social | NA |

FIG. 7C

| Mobile Sales Recontract | Revenue | 100,000 |
|---|---|---|
| | Customer Exp | 55 NPS |
| Channels | | |
| | Voice | RP |
| | Chat | RP |
| | Mobile | NA |
| | Social | NA |

FIG. 7D

| Broad Band New | Intention | |
|---|---|---|
| | Revenue | 300,000 |
| | Customer Exp | 5.5 NPS |
| Channels | | |
| | Voice | RP |
| | Chat | RP |
| | Mobile | NA |
| | Social | NA |

FIG. 7E

| Broad Band Recontract | Intention | |
|---|---|---|
| | Revenue | 300,000 |
| | Customer Exp | 5.5 NPS |
| Channels | | |
| | Voice | RP |
| | Chat | RP |
| | Mobile | NA |
| | Social | NA |

FIG. 7F

| Intention Group | | |
|---|---|---|
| Goal | SERVICE | CX |
| | Revenue | 0 |
| | Customer Experience | 43 NPS |
| Channels | ... | |
| | Voice | RP |
| | Chat | RP |
| | Mobile | NA |
| | Social | R |
| | ... | |

FIG. 8A

| Product Lines or Business Units | | |
|---|---|---|
| Mobile | Revenue | 0 |
| | Customer Exp | 43 NPS |
| Channels | ... | |
| | Voice | RP |
| | Chat | RP |
| | Mobile | NA |
| | Social | NA |
| | ... | |

| Product Lines or Business Units | | |
|---|---|---|
| Broad Band | Revenue | 0 |
| | Customer Exp | 43 NPS |
| Channels | ... | |
| | Voice | RP |
| | Chat | RP |
| | Mobile | NA |
| | Social | NA |
| | ... | |

FIG. 8B

| Mobile Complaint | Intention | |
|---|---|---|
| | Revenue | 0 |
| | Customer Exp | 38 NPS |
| Channels | ... | |
| | Voice | RP |
| | Chat | RP |
| | Mobile | NA |
| | Social | NA |
| | ... | |

FIG. 8E

| Broadband Complaint | Intention | |
|---|---|---|
| | Revenue | 0 |
| | Customer Exp | 60 NPS |
| Channels | ... | |
| | Voice | RP |
| | Chat | RP |
| | Mobile | NA |
| | Social | NA |
| | ... | |

| Intention Group | | |
|---|---|---|
| Goal | Revenue | 0 |
| | Customer Experience | 43 NPS |
| Channels | | |
| | Voice | RP |
| | Chat | RP |
| | Mobile | NA |
| | Social | R |

FIG. 9B

| Broad Band | | | Product Lines or Business Units | |
|---|---|---|---|---|
| | | | Revenue | 0 |
| | | | Customer Exp | 43 NPS |
| | Channels | | | |
| | | | Voice | RP |
| | | | Chat | RP |
| | | | Mobile | NA |
| | | | Social | NA |

| Mobile | | | Product Lines or Business Units | |
|---|---|---|---|---|
| | | | Revenue | 0 |
| | | | Customer Exp | 43 NPS |
| | Channels | | | |
| | | | Voice | RP |
| | | | Chat | RP |
| | | | Mobile | NA |
| | | | Social | NA |

FIG. 9C

| Mobile Support | Intention | |
|---|---|---|
| | Revenue | 0 |
| | Customer Experience | 40 NPS |
| Channels | | |
| | Voice | RP |
| | Chat | RP |
| | Mobile | NA |
| | Social | NA |

FIG. 9D

| Broadband Support | Intention | |
|---|---|---|
| | Revenue | 0 |
| | Customer Exp | 45 NPS |
| Channels | | |
| | Voice | RP |
| | Chat | RP |
| | Mobile | NA |
| | Social | NA |

| Intention | |
|---|---|
| Applications Support Revenue | 0 |
| Customer Exp | 38 NPS |
| Channels | |
| Voice | RP |
| Chat | RP |
| Mobile | NA |
| Social | NA |

FIG. 9E

| Intention | |
|---|---|
| Faults Revenue | 0 |
| Customer Exp | 60 NPS |
| Channels | |
| Voice | RP |
| Chat | RP |
| Mobile | NA |
| Social | NA |

FIG. 9F

SYSTEM AND METHOD FOR CUSTOMER EXPERIENCE MANAGEMENT

CROSS-REFERENCE TO RELATED APPLICATIONS

This application is a continuation of U.S. patent application Ser. No. 14/141,405, filed on Dec. 26, 2013, now U.S. Pat. No. 9,392,116, the content of which is incorporated herein by reference.

BACKGROUND

A business may use a contact center for performing the functions of sales and service relative to the products and services available through the business. The services may vary depending on the type of contact center, and may range from customer service to help desk, emergency response, telemarketing, and the like. In order to provide the functions of sales and service, contact centers engage in interactions with the customers via a number of communication channels, such as telephone, email, live web chat, and the like.

In a typical scenario, an inbound interaction from a customer to the contact center (e.g. inbound voice call), is routed to a contact center target (e.g. contact center agent), for processing. In the typical scenario, the routing of the interaction is based on predefined rules that define the requirements for routing the interaction.

It would be beneficial, however, to manage customer experience during an interaction based on current data so as to maximize use of resources and maximize one or more goals of the business.

SUMMARY

Embodiments of the present invention are directed to a system and method for managing an interaction for a contact center. A processor is configured to identify an intent for an interaction between a customer and the contact center. The intent may be derived by the processor based on data accumulated on the customer. The processor is configured to identify a contact center business goal related to the intent. A current contact center performance in achieving the contact center business goal is also identified, and a performance gap relative to the business goal is identified based on the determination. The processor is further configured to identify the performance of contact center targets when handling the intent. One or more of the contact center targets are identified based on the determined performance of the contact center agents and the identified performance gap relative to the business goal. Availability of a particular contact center target is determined for addressing the intent during the interaction. The particular target is then selected for addressing the intent during the interaction.

According to one embodiment, the determining the performance of the contact center targets includes identifying, by the processor, first and second contact center metrics identified as being correlated to each other, and calculating, by the processor, a performance score for each of the plurality of contact center targets. The calculating may be based on historical performance of the corresponding target for the intent in regards to the first and second contact center metrics.

According to one embodiment, the identifying of one or more of the plurality of contact center targets includes identifying a minimum performance score; and selecting a contact center target with a performance score satisfying the minimum performance score.

According to one embodiment, the minimum performance score is based on the identified performance gap.

According to one embodiment, a system and method for managing an interaction for a contact center includes identifying, by a processor, first and second type of intents for an interaction between a customer and the contact center. The first type of intent is provided by the customer upon initiating the interaction with the contact center, and the second type of intent is derived by the processor based on data accumulated on the customer. The processor is configured to identify first and second contact center business goals related to respectively the first and second types of intents. The processor is also configured to determine current contact center performance in achieving the first and second contact center business goals. First and second performance gaps relative to the first and second contact center business goals are identified based on the determination. The processor is configured to determine performance of a plurality of first contact center targets and performance of a plurality of second contact center targets when handling respectively the first and second types of intents. The processor is further configured to identify one or more of the plurality of first contact center targets based on the determined performance of the plurality of first contact center targets and the identified first performance gap relative to the first contact center business goal. The processor is also configured to identify one or more of the plurality of second contact center targets based on the determined performance of the plurality of second contact center targets and the identified second performance gap relative to the second contact center business goal. The processor is configured to determine availability of a particular target selected from the identified one or more of the first and second contact center targets. The processor is also configured to deliver the interaction to the particular target in response to determining that the particular target is available. The processor is configured to prompt the particular target to address both the first and second types of intents during the interaction.

According to one embodiment, the first type of intent identifies a reason for the customer initiating the interaction.

According to one embodiment, the second type of intent is related to an opportunity for the contact center in achieving the second contact center business goal.

According to one embodiment, the first or second contact center business goal relates to at least one of revenue or customer experience.

According to one embodiment, the determining the performance of the plurality of first contact center targets and the performance of the plurality of second contact center targets further includes: identifying, by the processor, first and second contact center metrics identified as being correlated to each other; calculating, by the processor, a first performance score for each of the plurality of first contact center targets, wherein the calculating is based on historical performance of the corresponding first contact center target for the first type of intent in regards to the first and second contact center metrics; and calculating, by the processor, a second performance score for each of the plurality of second contact center targets, wherein the calculating is based on historical performance of the corresponding second contact center target for the second type of intent in regards to the first and second contact center metrics.

According to one embodiment, the identifying of one or more of either the plurality of first contact center targets or the second contact center targets includes: identifying a minimum performance score; and selecting a contact center target with a performance score satisfying the minimum performance score.

According to one embodiment, the minimum performance score is based on the performance gap related to the corresponding type of intent.

According to one embodiment, the minimum performance score is based on interactions forecasted for the corresponding type of intent.

According to one embodiment, the determining the availability of the particular target includes determining, by the processor, first and second customer patience measures relating respectively to the first and second type of intents; and determining, by the processor, whether the interaction may be delivered to the particular target within limits of the first and second customer patience measures. The processor is configured to deliver the interaction to the particular target in response to determining that the interaction may be delivered within the limits of the first and second customer patience measures.

As a person of skill in the art should appreciate, embodiments of the present invention remove the reliance on preset rules and allow routing decisions to be dynamic based on current data. Embodiments of the present invention also allow identification of opportunities for additional conversations/interactions at a time and with a resource predicted to maximize outcomes for the organization.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 2A and 2B are conceptual layout diagrams of exemplary correlation matrices according to one embodiment of the invention;

FIG. 3 is a conceptual layout diagram of a table of exemplary MAC scores for different agents for a particular type of intent according to one embodiment of the invention;

FIG. 4A is a conceptual layout diagram of ten agent groups generated based on exemplary MAC scores according to one embodiment of the invention;

FIGS. 4B-4C are graphs measuring different performance metrics of the agent groups in FIG. 4A according to one embodiment of the invention;

FIGS. 4D-4E are charts of performance metrics of a routing group generated based on the agent groups in FIG. 4A for routing interactions to the routing group according to one embodiment of the invention;

FIGS. 6-9F are conceptual layout diagrams of exemplary goals that an administrator may set for different goal levels according to one embodiment of the invention;

DETAILED DESCRIPTION

Figure 1:
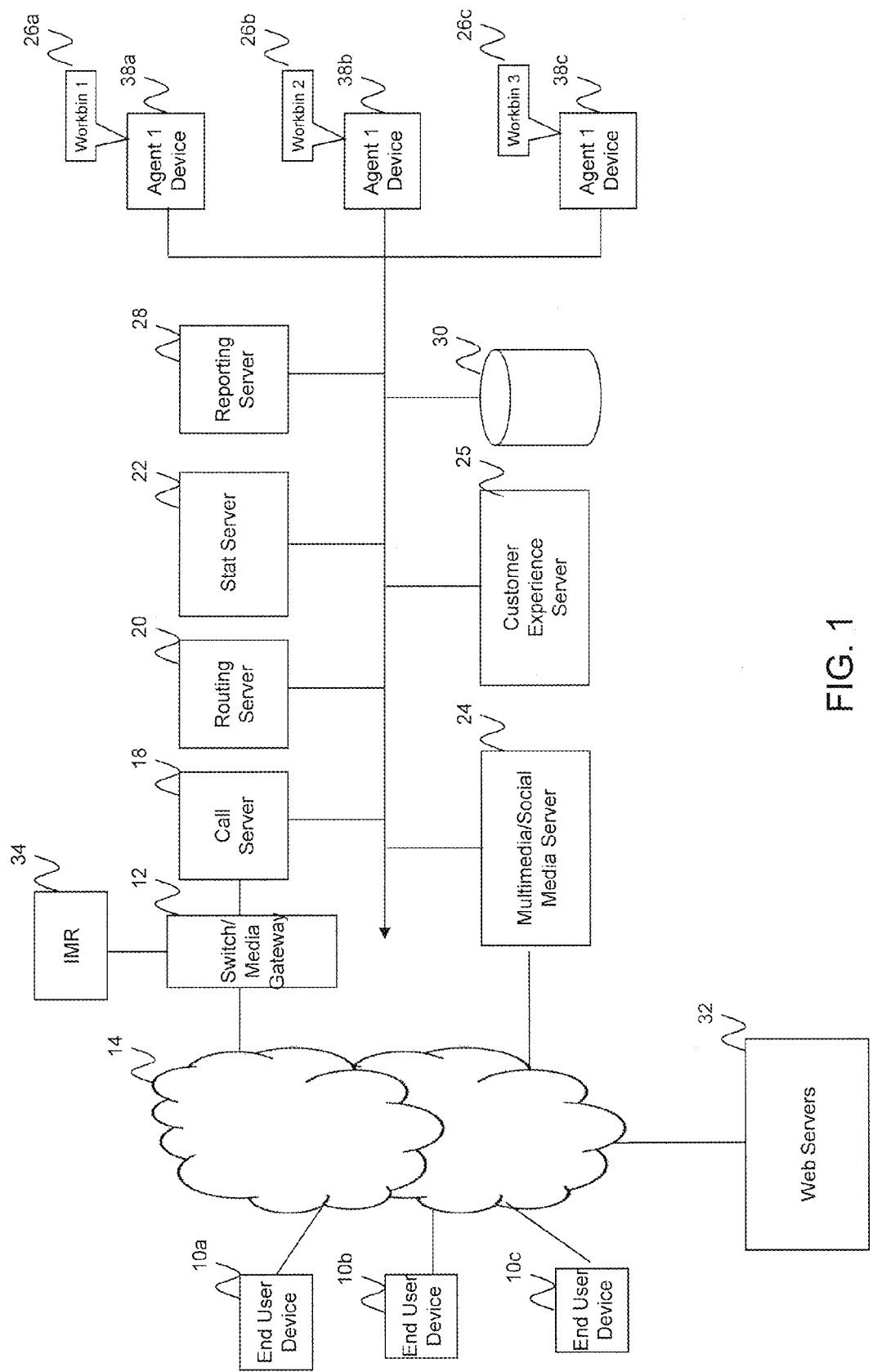
FIG. 1 is a schematic block diagram of a system supporting a contact center for customer experience management according to one exemplary embodiment of the invention.

In general terms, embodiments of the present invention are directed to a system and method for managing a customer's experience with a contact center that takes available data about the customer, the agents of the contact center, and the organization represented by the contact center, for identifying opportunities for additional conversations/interactions with the customer and engaging in those additional conversations/interactions at a time and with a resource predicted to maximize outcomes for the organization. Although the term conversation and interaction are used herein, a person of skill in the art should recognize that conversations and interactions are not limited to voice communications, but include chat, text, email, video, and any other form of real-time and/or non-real time communication conventional in the art.

According to one embodiment, customer experience management may start with identification of a customer's reason for initiating an interaction with the contact center, referred to as an explicit intent/intention. Embodiments of the present invention also allow identification of opportunities or leads for engaging in a conversation or interaction with the customer, referred to as implied intents/intentions. Such identification may be based on information gathered on the customer, goals of the organization, and the like. For example, a customer may initiate a voice call to the contact center with a billing inquiry for his wireless phone. In this example, the billing inquiry would be the customer's explicit intent for the interaction. The customer initiating the contact may also trigger identification of implied intents identified for the customer. One such implied intent may be wireless service contract renewal. Although the customer did not call specifically to renew his contract, the customer may be inquired to renew his contract if it is detected that the customer's contract is about to expire.

According to one embodiment, the mapping of resources for explicit and implied intents is based on predictive modeling of customer outcomes and organizational goals. In this regard, embodiments of the present invention are configured to honor a customer's explicit intent as a main goal, and attempt to satisfy implied intents when capacity exists. The capability of a resource (e.g. an agent) required to meet the needs of a specific intent is, according to one embodiment, dynamic and based on current performance of the contact center against an associated business goal. For example, a less competent agent may be acceptable to handle an interaction where the associated business goal is being exceeded.

If capacity issues arise, the implied intention is parked for follow-up at another available instance. For example, a customer browsing online for a particular product may trigger identification of an implied intent to purchase the product. However, if there is no current capacity at the contact center to initiate an outbound interaction with the customer (e.g. by initiating a voice call), a message may be displayed offering a callback to the customer when agents become available.

According to one embodiment, outcome of interactions are monitored and used to learn and modify future responses that are suggested by the system in terms of, for example, timing of such responses and/or resources identified for such responses. For example, the outcome of the interactions may be used to evaluate or re-evaluate an agent's performance with respect to intents associated with the interactions. The outcome of the interactions may also be used to evaluate or re-evaluate how fast interactions with the same intent should be routed to agents for handling.

FIG. 1 is a schematic block diagram of a system supporting a contact center for customer experience management according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be deployed locally in equipment dedicated to the enterprise or third-party service provider, and/or deployed in a remote computing environment such as, for example, a private or public cloud environment with infrastructure for supporting multiple contact centers for multiple enterprises.

Customers, potential customers, or other end users (collectively referred to as customers) desiring to receive services from the contact center may initiate inbound interactions, such as, for example, calls, to the contact center, via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling components of the contact center.

The contact center may also include a multimedia/social media server 24 for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used for identifying an explicit reason for the interaction and selecting the appropriate resource for that interaction.

If the call is to be routed to an agent, the call is forwarded to the call server 18 which interacts with a routing server 20 for routing the call to an appropriate agent. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

According to one embodiment, the system includes a customer experience server 25 interacting with the routing server 20 for managing a customer experience and maximizing outcomes according to one embodiment of the invention. The customer experience server 25 may include one more software modules for identifying opportunities for interacting with a customer, identifying resources for handling the interactions, determining timing for handling of the interactions, and learning from results of the interactions. In this regard, the customer experience server 25 may be configured to query one or more databases for obtaining customer data (e.g. customer profiles), agent data (e.g. agent profiles, schedules, etc.), interaction data (e.g. details of each interaction with a customer, including reason for the interaction, disposition data, time on hold, handling time, etc.), data about the organization (e.g. current business goals and performance statistics), and any other data provided, for example, by an external data source, in order to identify appropriate opportunities and resources. The data may be stored in a mass storage device(s) 30 which may take the form of a hard disk or disk array. The one or more databases storing a customer's profile and interaction/case data may generally be referred to as a customer database. According to one embodiment, some of the data (e.g. customer profile data) may be provided by a third party database such as, for example, a third party customer relations management (CRM) database. In one embodiment, some of the data is stored in buffer memory of the customer experience server 25.

According to one embodiment, the customer experience server 25 may query for the customer data using an ANI or any other information collected by the IMR 34 and forwarded to the customer experience server 25 by the call server 18 or routing server 20.

According to one embodiment, selection of an appropriate target to handle an interaction is based on predicted performance of the resource in handling express and/or implied intents during the interaction, as well as the agent's availability within a time period that is predicted to maximize outcomes for the express and/or implied intents. Information on the agent's availability may be obtained, for example, from the statistics server 22.

Once the appropriate agent is identified to handle the interaction, a connection is made between the customer and an agent device 38a-38c (collectively referenced as 38) of the identified agent. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms. Collected information about the caller and/or the caller's historical information may be displayed on the agent's computer device for aiding the agent in better servicing the call. The agent may also be coached via prompts displayed on the computer on how to handle the interaction. For example, the agent may be coached to bring up an implied intent identified for the customer after the express intent has been resolved.

The contact center may also include a reporting server 28 configured to generate reports from data aggregated by the statistics server 22. Such reports may include near real-time reports or historical reports concerning agent performance, contact center performance, missed opportunities relating to implied intents that could not be handled due to, for example, lack of resources.

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Selection of agents to handle these types of activities may also depend on agent and contact center performance, business goals, and the like. Once assigned to an agent, an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one embodiment, customer experience management and outcome maximization includes identification of reasons or purposes (collectively referred to as intents or intentions) for an interaction between a customer and the contact center. As an example, two types of intents may be identified for a customer who has initiated contact with the contact center: 1) explicit/express intent(s); and 2) implied intent(s).

According to one embodiment, an express intent is provided by the customer upon initiating the interaction with the contact center. The customer's express intent may be obtained from multiple sources, such as, for example, utterances from the customer, interactions with the IMR server 34, and/or other express actions taken by the customer.

Taking the IMR server 34 as an example, the IMR server 34 may be configured to ask the customer an open-ended question to elicit information on the reason for the call. For example, the IMR server 34 may be configured to ask "How can I help you?" The customer may answer by speaking a reason for the call, such as, for example, "Am I eligible to upgrade my phone?" According to one embodiment, the phrase uttered by the customer is analyzed by a speech analytics module which may be part of, or separate from, the customer experience server 40, and the call is then categorized into a particular category, such as, for example, an "upgrade eligibility" category which is then set as the express intent for the call. In other embodiments, the question asked by the IMR server 34 is not open-ended, but limits the caller's response to, for example, a particular subject. Of course, the IMR server 34 may also be configured to function as a traditional IVR where the customer is provided a list of reasons for the call, and the customer presses a number that matches his or her reason for the call. The explicit intent may then be deduced from the particular number pressed by the customer. In another example, an unresolved intent from a prior interaction may be identified as a potential reason for the current call, and the customer may be asked to verify that the current reason for the call is to resolve the unresolved intent.

The express customer intent for an interaction may also be provided via other modalities, such as, for example, the Web, chat, text, email, social media channels, and/or the like. If the customer initiates the contact via a mobile application, intent data may be collected by the mobile application prior to initiating the call. The collected intent data may then be provided to the contact center over a data channel prior to connecting the customer to an agent over a voice channel.

Similarly, if the customer is browsing a web site prior to contacting the contact center, information gathered by the web site may be provided to the contact center as the customer's express reason for initiating the contact. For example, a customer may be browsing a company web page relating to "Flying with Pets Policy" when the customer selects a "speak with an agent" option. Information on the page being browsed may be transmitted along with the request to speak with the agent, and from the transmitted information it may be determined that the customer's reason for wanting to speak with the agent is related to "Flying with Pets."

Capturing a customer's explicit intent allows the contact center to provide the customer with the ability to resolve their interaction the first time (referred to as a first contact resolution). This may be important in meeting service-related metrics.

According to one embodiment, an implied intent is an intent derived by the customer experience server 25 based on, for example, data accumulated on the customer, overall business goals of the organization, and/or the like. In some instances, implied intents may be described as opportunities or leads of the contact in achieving a business goal. Such goals include but are not limited to: revenue/sales (overall, by product, by service, etc.), costs to serve, collections, and retention. For example, a customer calling with the explicit intent of disputing a credit card transaction may be identified, based on specific customer data and the goal of the organization to increase revenues, as being eligible for an implied intent of a credit-card-limit-increase upsell. A reactive event may be generated for the particular implied intent for execution by the current (or some other) agent during the current call.

Implied intents may also be gathered using technology like web engagement or proactive chat. While the customer has not specifically requested an interaction with that intent, the interaction may be offered as a proactive event based on the customer browsing the company's website and viewing information on particular products or services.

According to one embodiment, implied intents are addressed when capacity allows them to be addressed. In this regard, a customer's express intent is honored first prior to addressing an implied intent. Priority of the implied interactions may also be allocated based on customer value, available staff, ability to execute, and the like.

Customer experience management and outcome maximization also includes identifying meaningful attributes for determining performance of contact center targets for predicting performance of those targets in handling particular types of intents. The term contact center target is used generally herein to refer to a contact center resource, whether it be an automated resource, human resource (e.g. a contact center agent), or a resource group.

Once the appropriate attributes are identified, the experience management server 25 may calculate a score indicative of an agent's performance/competency/capability to meet the needs of a specific intent, whether it is explicit or implied, hereinafter referred to as a meaningful attribute calculation (MAC) score or performance score. In one embodiment, the MAC score is used to predict the outcome of routing a specific interaction with a specific intent type to a specific resource.

The attributes selected for generating the MAC score may be one or more contact center metrics (measures) that are typically collected by the contact center. Such metrics may include, for example, average handle time (AHT), net promoter score (NPS), resolution rate, total transfers, wait time, average hold duration, and the like. According to one embodiment, two types of attributes are selected for purposes of generating the MAC score: 1) a customer measure; and 2) a business measure. A customer measure may be a metric measured based on a customer providing his or her opinion of the interaction. For example, a customer may be prompted to provide his or her opinion regarding First Contact Resolution by asking, at the end of the interaction: "Was your interaction today resolved?" along with the option to answer "Yes," "No," or "Too Early to Tell." A business measure may be a metric configured to measure the importance of the transaction. This may range, for example, from feedback mechanisms like Net Promoter or Customer Effort, to performance measures like Credit Promises Kept or Sales Conversion rates. A particular contact center metric may qualify as a customer measure and/or business measure. Also, other categories other than customer and business measures may be selected for identifying the metrics that should be used in calculating the MAC score. Of course, as a person of skill in the art should appreciate, the MAC score may be calculated based on more or less than two attributes.

For example, the MAC score may be based on a selection of a single attribute or a combination of three or more attributes.

According to one embodiment, a customer measure and a business measure that are identified as being correlated to one another are selected for calculating the MAC score. In this regard, the customer experience server 25 has access to a database of metric correlations that may be specific to the particular contact center or a group of contact centers, such as, for example, contact centers in a particular vertical industry.

Figure 2A:
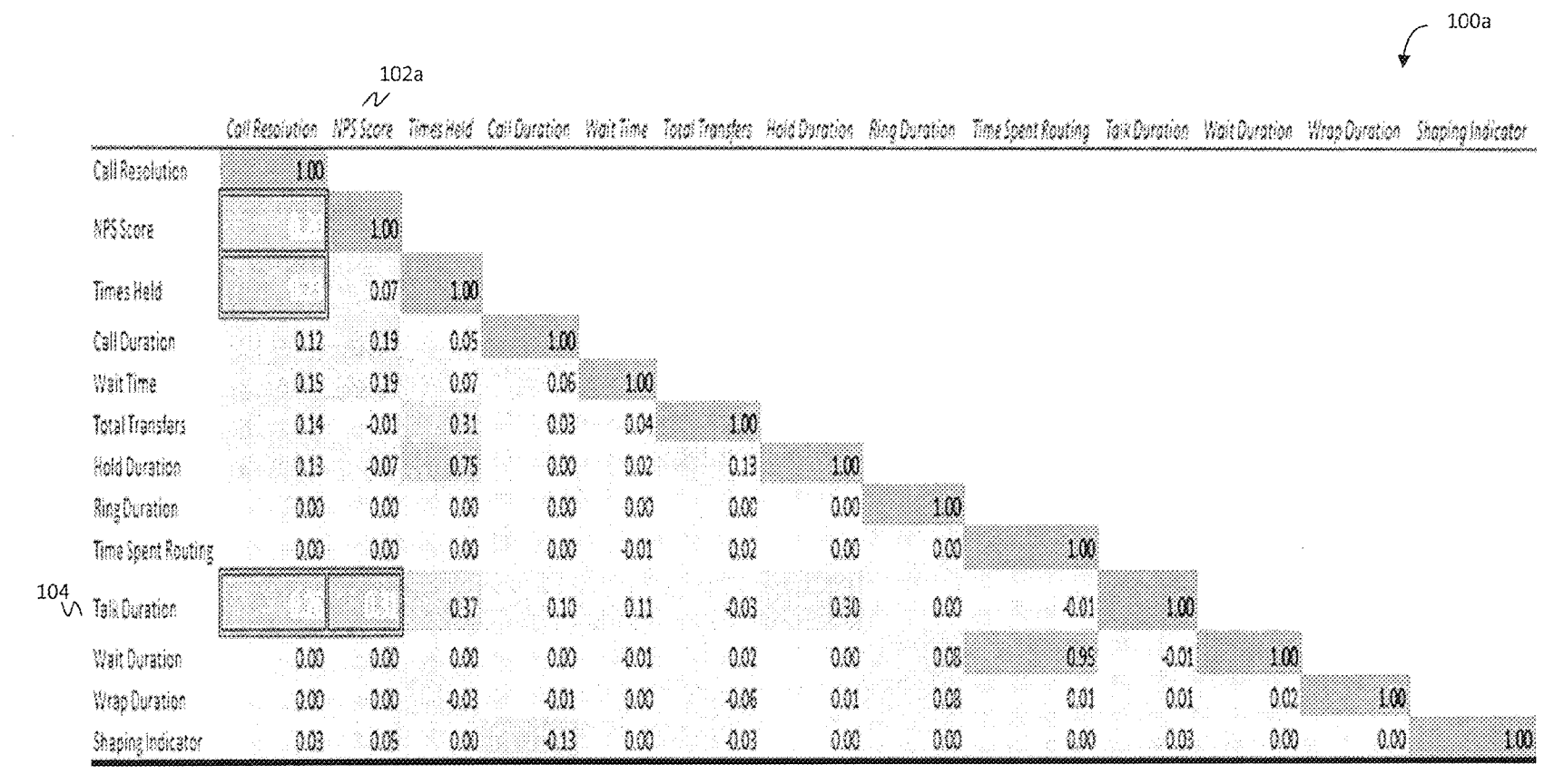
Figure 2B:
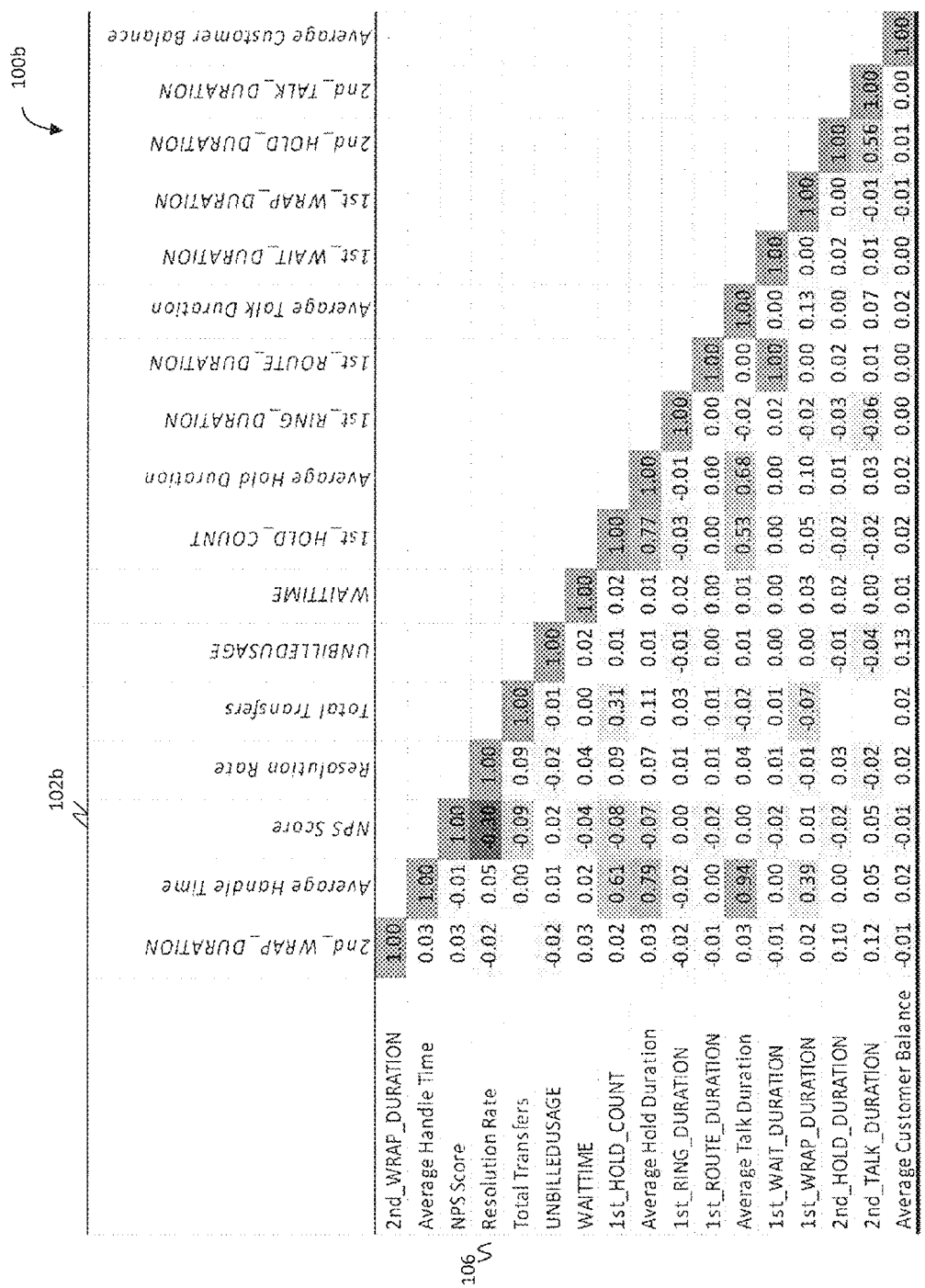

FIGS. 2A and 2B are conceptual layout diagrams of exemplary correlation matrices 100a, 100b according to one embodiment of the invention. The correlation matrices 100a, 100b identify how metrics that may be important to the customer align to a business benefit, and vice versa. The correlation matrix may be generated by the customer experience server (or any other server) automatically based on data on past interaction outcomes accumulated for the contact center or a group of contact centers, and stored in the mass storage device.

In the exemplary correlation matrix 100a of FIG. 2A, if NPS score 102a is selected as being an important business metric, the customer metric that would be deemed to be most highly correlated to NPS score is talk duration 104, with a correlation score of 0.31. This correlation score indicates that as NPS score goes up, talk duration is also predicted to go up.

In the exemplary correlation matrix 100b of FIG. 2B, taking NPS score 102b again as an important business metric, the correlation matrix 100b in this example identifies NPS score as most highly correlated to resolution rate 106, with a correlation score of −0.3. According to this correlation score, as NPS score goes up, resolution rate 106 is predicted to go down.

According to one example, the customer metric selected for the MAC score may be a resolution resolved % which measures a first contact resolution rate. The range of values for a resolution resolved % metric is 0% to 100%. The business metric selected for the MAC score may be, for example, an average NPS score. The range of values for an NPS score may be −200 to +200.

According to one embodiment, the customer and business metrics are first normalized so that the normalized value is 0 to 200. The MAC score may then computed using the normalized values according to the following exemplary formula:

$$\text{Sum(Customer Outcome Metric} \times \text{Business Outcome Metric)}$$

The normalizing of a contact center metric may be according to the formulas shown in Table 1. Of course, the normalization formulas in Table 1 are just exemplary. Other formulas may be used as will be appreciated by a person of skill in the art.

TABLE 1

| All values need to be out of +/−100. | |
|---|---|
| Measure Type | Formula |
| Whole Number less then 100, without Negative Values | Sum(Metric × 2) |
| Whole Number less then 100, with Negative Values that have a maximum of −100 | Sum(Metric + 100) |
| Whole Number greater then 100, | Sum(Maximum Metric Score/100) -> |

TABLE 1-continued

All values need to be out of +/−100.

| Measure Type | Formula |
|---|---|
| without Negative Values | Sum(Metric/First Calculation) |
| Percentage | Sum(Metric × 100) × 2 |

According to one example, a maximum MAC score computed according to the above formulas is 40,000 points, with 200 maximum points being contributed by the customer metric and 200 maximum points being contributed by the business metric. According to one embodiment, the MAC score may further be divided by 4,000 and rounded (e.g. rounded down) to give the agent a MAC score for the intent that is a whole number out of 10. According to this embodiment, agents may then be divided into 10 groups based on their MAC scores. Of course, as a person of skill in the art will appreciate, agents may be grouped into less groups or more groups than 10, or no groups may be generated at all.

According to one embodiment, a MAC score is computed for each agent for each specific type of intent based on the agent's past performance for that intent. In this regard, past interactions handled by the agent that are associated with a particular intent are identified, and customer and business metric values are computed for the agent for ultimately computing the agent's MAC score for the particular intent. The MAC score computation may be triggered automatically at periodic (regular or irregular) intervals such as, for example, on a weekly basis, every 30 days, on specified days and/or times, after a certain number of calls have been handled by the agent, after a certain number of hours have been logged by the agent, and/or the like. The interactions that may be considered for retrieving customer and business metric values may be those collected in a short term period for providing a short term MAC score, or for a long term period for providing a historical (long term) MAC score. For example, the historical MAC score may be an average of all past short term MAC scores calculated for the agent.

FIG. 3 is a conceptual layout diagram of a table of exemplary MAC scores for different agents for a particular type of intent, where the MAC scores are calculated using the above discussed MAC calculation and normalization formulas. In the example of FIG. 3, Agent 200 has an average NPS score of 100, and a 100% first call resolution rate. The normalized business measure for this agent based on the NPS score is 200 (100×2) per the first normalization formula in Table 1, and the normalized customer measure for this agent based on the resolution rate is also 200 ((0.100×100)×2) per the last normalization formula in Table 1. Thus, the MAC score for agent 200 according to this example is 200×200=40,000.

Agent 202 has an average NPS score of −33.33, and a first contact resolution rate of 66.67%. The normalized business measure for this agent based on the NPS score is 66.67 points (−33.33+100) per the second normalization formula in Table 1, and the normalized customer measure for this agent based on the resolution rate is 133.33 points ((0.6667×100)×2) per the last normalization formula in Table 1. The MAC score for agent 202 according to this example, therefore, is 66.67×133.33=8889. Thus, according to this MAC score which considers NPS score and first contact resolution rate as measures for evaluating an agent's performance, agent 202 may be deemed to have lower proficiency for these types of interactions than agent 200.

The assigning of MAC scores to agents for a particular intent type allows selection of the right resources for an interaction associated with the particular intent type. For example, based on MAC scores calculated for all or a subset of agents at the contact center, the agents may be divided into groups. True performance of the agents against different business measures may then be evaluated for selecting the appropriate agent based on current needs.

FIG. 4A is a conceptual layout diagram of 10 agent groups generated based on exemplary MAC scores according to one embodiment of the invention. According to this example, agents are assigned a MAC score of 1 to 10, and grouped into 10 groups based on their MAC scores. In this example, the agents in group 10 have a MAC score of 10, which correlates to a highest group NPS score (96.79) and highest group first contact resolution rate (99.84%). Agents in group 1 have a MAC score of 1, which correlates to a lowest group NPS score (−78.16) and lowest group first contact resolution rate (54.73%). Based on this grouping of agents, the customer experience management server may choose to limit the routing of intentions to agents within certain groups, and hence, certain MAC scores, based on current contact center performance. The generated MAC groups may be referred to as a routing group. For example, if the contact center is under-achieving certain business goals, the server 25 may contract the agent pool to routing groups that include agents whose performance is above average. A typical business goal may be a specific NPS goal, such as, for example, an NPS goal of 50. If the current NPS of the contact center is only 35, the resource pool may be contracted to select agents whose NPS scores are above average and thus have a higher likelihood of successfully contributing to meet the company's NPS goal. However, if the contact center is over-achieving in certain business goals, the server 25 may extend the agent pool to routing groups that include agents whose performance is below average.

FIGS. 4B-4C are graphs measuring different performance metrics of the agent groups in FIG. 4A according to one embodiment of the invention. As shown in this example, each group has its own performance against the two identified metrics making up the MAC score (e.g. NPS score and resolution resolved %). The chart identifies groups of staff who do and do not perform well in these two metrics. For example, groups 1-6 are below an average NPS score of 33.07 calculated across all groups, as well as below an average resolution resolved rate % of 88.89%. On the other hand, groups 1-7 are above both the average NPS score and resolution resolve rate %.

FIGS. 4D-4E are charts of performance metrics of a routing group generated based on the agent groups in FIG. 4A for routing interactions to the routing group according to one embodiment of the invention. A performance gain may be determined for the business to choose to limit the routing of interactions to agents within certain groups. For example, the performance achieved in a routing group including groups 4-10 (FIG. 4E) may be compared against the performance achieved in a routing group including only groups 5-10 (FIG. 4D). The performance gain by removing staff in groups outside of the performance band is the sum of those that are inside the group versus the grand total.

Figure 5A:
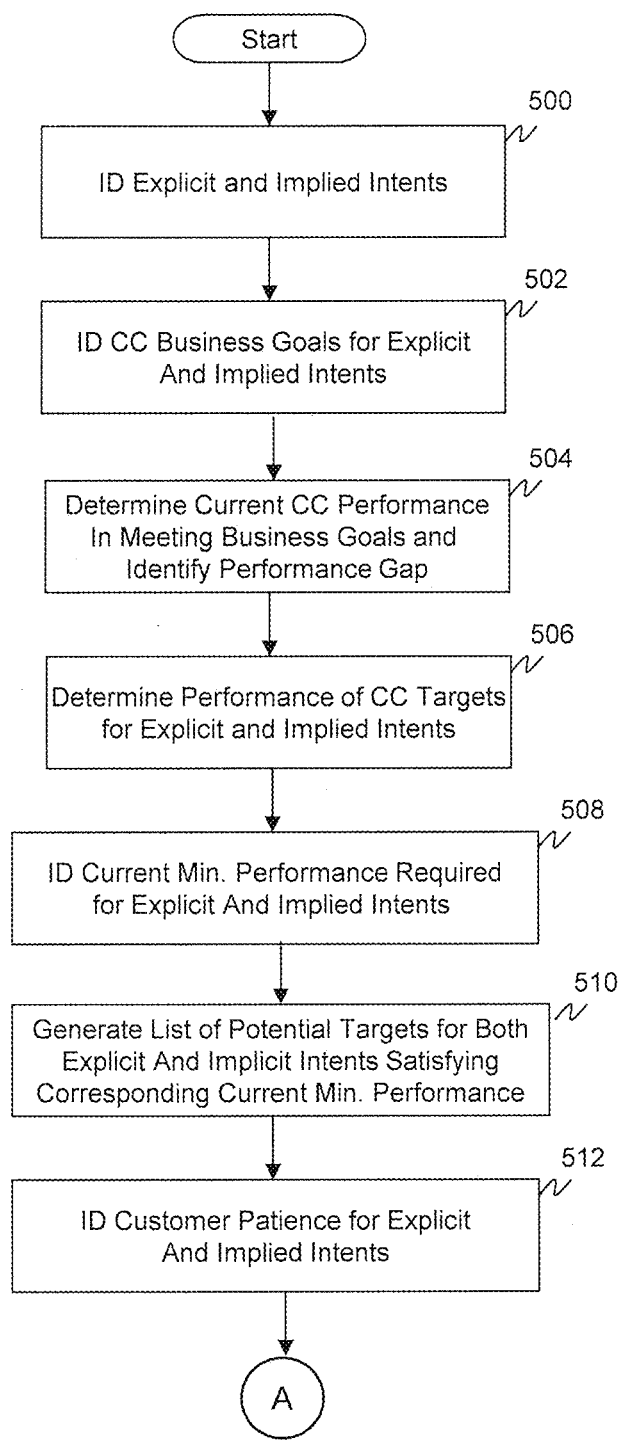
FIGS. 5A-5B are flow diagrams of a process for customer experience management executed by the customer experience server 25 according to one embodiment of the invention.
Figure 5B:
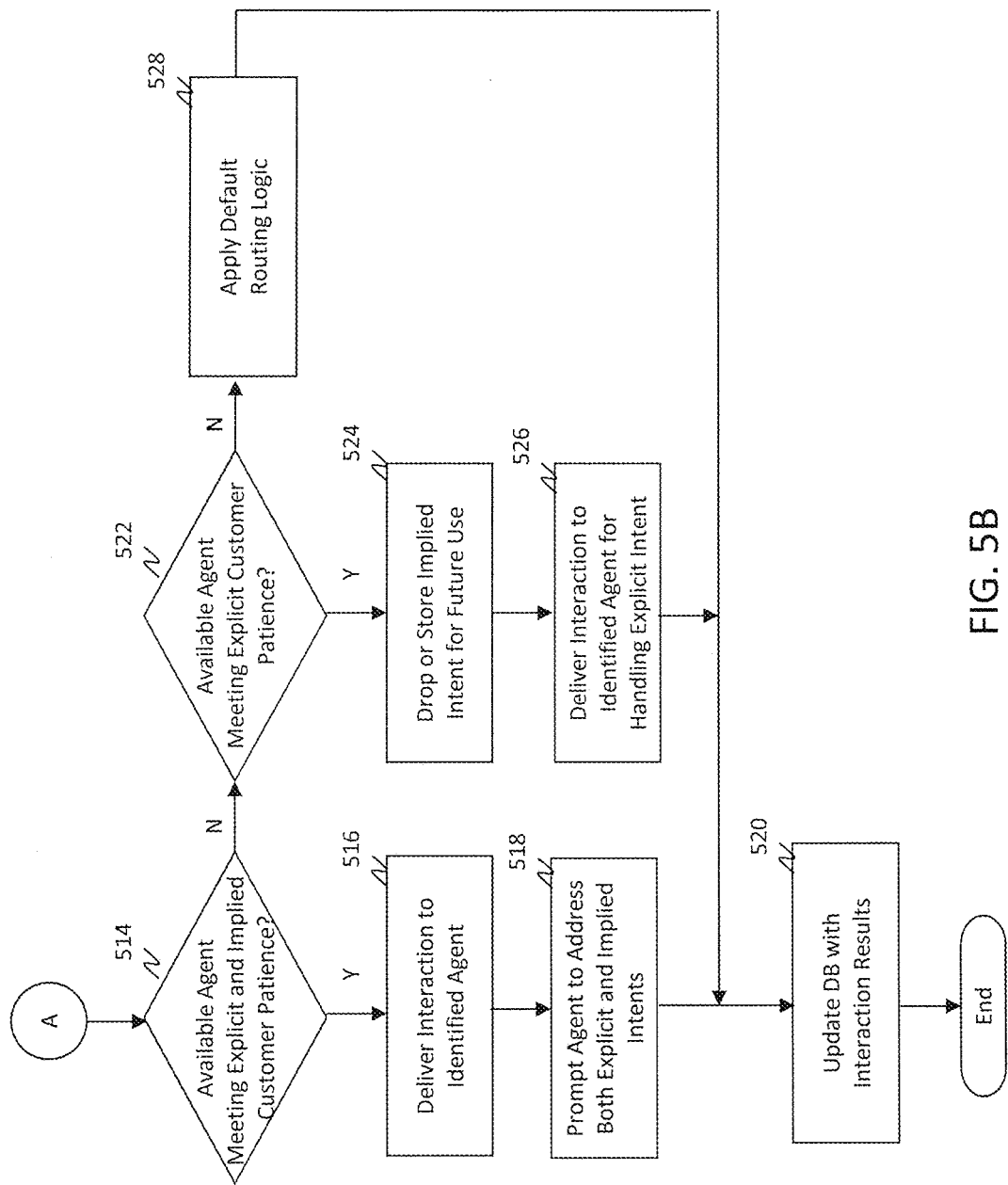
Figure 8C:
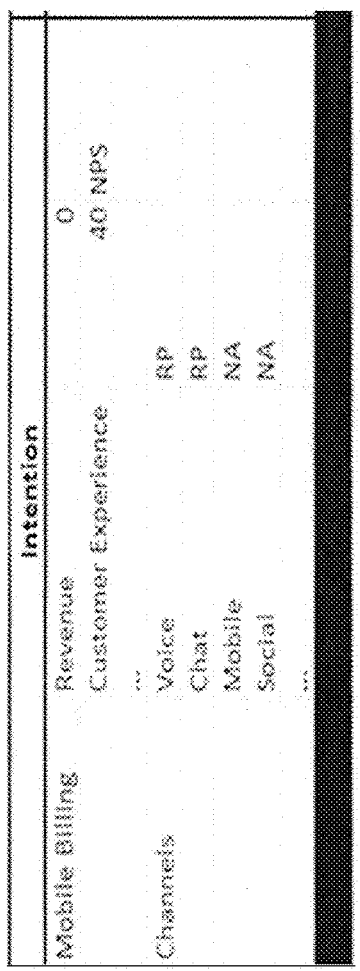
Figure 8D:
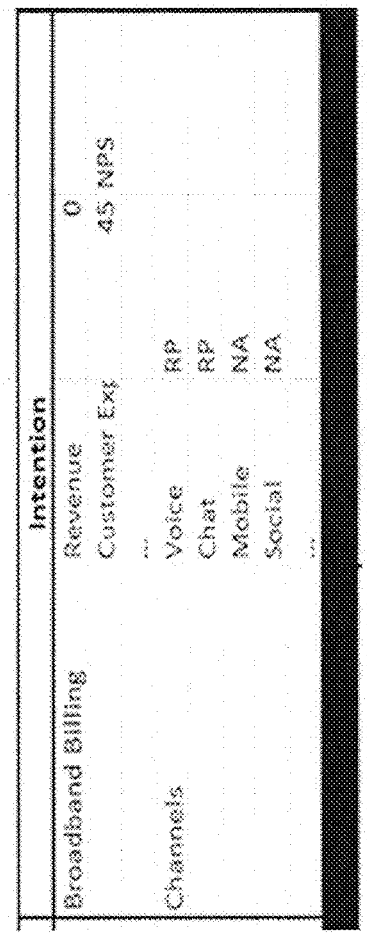

FIGS. 5A-5B are flow diagrams of a process for customer experience management executed by the customer experience server 25 according to one embodiment of the invention. The process may be triggered in response to a particular event, such as, for example, an inbound interaction from a customer.

The process starts, and in act 500, the server 25 identifies both explicit and implied intents associated with the interaction. Identification of the explicit intent may be based on speech analytics of the customer's utterances, interaction with the IMR server 34, interaction with the organization's website, and/or the like. As discussed above, the explicit intent is a reason why the customer is contacting the contact center. For example, the customer may have a specific problem, question, and/or the like. Based on the customer's input, the server 25 categorizes the explicit intent into one of various known categories.

In addition to the explicit intent, one or more implied intents may be identified for the customer based on knowledge of the customer, current business goals, and the like. In this regard, the implied intents may be a list of opportunities gathered for the customer, such as, for example, credit card upsell, contract renewal upsell, and/or the like, for achieving one or more contact center business goals. If multiple implied intents are identified for the customer, the intents may be prioritized according to one or more factors. One such factor may be the current performance of the contact center in achieving the one or more contact center business goals. For example, if the organization has a goal of 100 new contract renewals for the month, and only 40% of the goal is achieved on the 15th of the month, the contract renewal upsell may be ranked higher than another implied intent not relating to contract renewal.

Another factor that may be relevant in prioritizing the implied intents may be the particular explicit intent identified for the interaction. For example, certain implied intents handled in conjunction with certain explicit intents may have a higher success rate than when handled with other unrelated explicit intents. Thus, according to one embodiment, a rank assigned to an implied intent based on current performance of the contact center may be modified based on a success rate of handling the implied intent together with the express intent.

According to one embodiment, an implied intent with the highest rank is selected for the customer for the current interaction. In other embodiments, the selected implied intent does not have the highest ranking.

In act 502, the server 25 identifies the goals/targets of the business for the identified explicit and implied intents. The goals may vary from organization to organization, from one intent to another, and/or the like. For example, the organization may have a global target for a particular NPS score, sales, collection, and/or profit. More specific goals may then be set for different intent types, product lines, business units, and/or the like. For example, sales based intents may have goals relating to conversion rate, revenue, and sales, while service based intents may have goals relating to customer effort, NPS, and/or the like. According to one embodiment, global targets default to more specific goals set at an intent level unless otherwise specified by an administrator. For example, if a specific intent is associated with a target revenue goal, the revenue goal for the target may be selected in act 502 instead of the global organizational revenue goal.

In act 504, the server 25 identifies the current contact center performance in meeting the identified business goals, and compares the current performance against the business goals to determine the performance gap(s). Performance gaps may be indicative of the contact center over-performing or under-performing relative to a business goal. Current contact center performance data may be accumulated in one or more databases of the mass storage device 30, in buffer memory of the server 25, and or the like, and updated on a regular or non-regular basis. For example, the mass storage device 30 and/or buffer memory may store current statistics related to the various business goals of the organization, such as, for example, current revenue, sales, collection, profit, NPS score, and the like. The current statistics may be maintained on an organization level, or further broken down into intent level, product level, business unit level, and/or the like.

According to one embodiment, the current performance data identifies the contact center as under-achieving or over-achieving the business goals identified for the explicit and implied intents. For example, if target for a business goal is 35%, but the current performance is 30%, the contact center is deemed to be under-achieving the goal by 5%.

In act 506, the server 25 determines the current performance of various contact center targets in handling the explicit and implied intents for identifying the right resource(s) for handling the implied and/or explicit intents in light of the performance gap. In this regard, the server 25 identifies MAC scores for the various targets for the implied intents as well as MAC scores for the explicit intents. The MAC scores may be pre-computed and stored in the mass storage device for retrieval by the server 25 when needed. The mass storage device may store one or more different MAC stores for each agent based on one or more different combinations of business and customer measures identified for the contact center. According to one embodiment, the identified business and/or customer measures are based on the business goals of the contact center. For example, if one of the goals of the contact center is a particular sales conversion rate, the business metric selected for calculating MAC scores for the agents may also be sales conversion rate. A customer metric most highly correlated to sales conversion rate may then be selected (e.g. automatically by the server 25), based on a current correlation matrix, such as, for example, the correlation matrix 100a or 100b of FIGS. 2A, 2B. For example, first contact resolution may be selected as the customer metric due to its high correlation to sales conversion rate.

According to one embodiment, the agents may be allocated into routing groups based on the assigned MAC scores for a particular intent. For example 10 routing groups may be generated as in the example of FIG. 4 based on MAC scores ranging from 1 to 10. In this manner, agents with similar performance may be grouped together for ease of management. Of course, the groups may be less or more than 10 as desired by the contact center, or no groups may be generated at all.

In act 508, the server 25 identifies a current minimum performance required for each of the explicit and implied intents in order to make up for the performance gap identified in act 504. According to one embodiment, the server 25 calculates a minimum performance score for each of the explicit and implied intents. In this regard, the server 25 takes into account various factors including, without limitation: 1) the calculated performance gap; 2) MAC scores; 3) number of interactions already handled in a particular intention period (e.g. 24 hours); and/or 4) number of interactions forecast for this intent in the same period. The number of interactions forecast for a particular intent may be based on historical analysis of past interactions as will be understood by a person of skill in the art.

Calculation of a minimum performance score is provided below as an example based on the following exemplary values:

a) Current Performance: 30% achieving a threshold MAC score b) Target Performance 35% achieving the threshold MAC score d) Interactions Completed: 600
e) Interactions Forecasted: 1000
f) Interactions remaining: 400

Conversions Forecasted: Interactions Forecasted (1000)× Target Performance (35%)=350 interactions need to be converted in a day.

Conversions Completed: Interactions Completed (600)× Current Performance (30%)=180 achieved threshold MAC score so far.

Required Conversions: Conversions Forecasted (350)−Conversions Completed (180)=170 still need to achieve the threshold MAC score.

Minimum Performance Score: Required Conversions (170)/Interactions Remaining (400)=42.5%

Given that the contact center is under-achieving its MAC threshold score goal by 5%, agents who have a performance history to lift the current performance up are desired. Specifically in the above example, agents who are predicted to deliver a rate greater than 42.5% in meeting the MAC threshold score are considered as valid targets.

By dynamically calculating the minimum performance score based on current contact center data and an agent's predicted performance, a determination may be made in real time to contract or expand the eligible routing groups to accommodate current contact center metrics. Available agents may then be selected from the eligible routing groups.

In act 510, the server 25 generates a list of potential targets for both explicit and implied intents that satisfy the corresponding current minimum performance score. The potential targets may be a list of potential agents or agent groups.

In act 512, the customer patience for each of the explicit and implied intents are determined for determining how soon an interaction should be routed to an agent. A customer patience value may be, for example, a wait time in which customer abandonment increases suddenly, and/or when a particular business metric starts to be severely impacted. According to one embodiment, patience is associated with each intent, explicit and implied, of an interaction, and the choice of executing against an implied intent is based on the ability to meet the patience threshold of that intent. According to one embodiment, a value calculation may also be added to the patience value to ensure that if there are limited resources for execution of intents, the most value ones are handled first. Value may be calculated based on customer segmentation (e.g. gold customer, silver customer, bronze customer), transaction value or importance, and the like.

According to one embodiment, customer patience is calculated based the following non-limiting criteria for each interaction: 1) specific customer's past behavior (e.g. abandons, customer experience feedback, purchases, and the like); 2) like customer's (e.g. in age, sex, product holding, etc.) past behavior; 3) explicit intent of the interaction; and 4) channel of the interaction (e.g. voice, email, text, etc.). Different types of intents and different types of interaction channels may provide different patience thresholds. According to one embodiment, the various criteria are evaluated to determine: 1) the likely time at which the customer will abandon the specific interaction; and 2) the likely time at which achieving the required outcome is compromised (e.g. will result in poor customer experience feedback via a poor NPS score or other like score), or will reduce the ability to make a sale. According to one embodiment, the customer patience threshold is set to be the lesser of the two times.

As an example, assume that a customer's explicit intent is billing inquiry, and the implied inquiry is a sale. Based on the customer's specific past behavior, behavior of other like customers, explicit intent of the interaction, and the channel of interaction, it is predicted that an NPS score above a threshold may be expected for the explicit intent if the customer waits 2 minutes before being routed to an agent. Thus, the customer patience threshold for the explicit intent may be set to be 2 minutes. However, historical data may also indicate that waiting 2 minutes results in a low probability of sale. Historical data may indicate that the probability of a sale rises above a desired threshold when customers wait 30 seconds or less prior to being routed to an agent. Thus, the customer patience value for the implied intent of sales may be set to be 30 seconds instead of 2 minutes.

According to one embodiment, the server 25 attempts to identify, in act 514, from the eligible routing groups, a target with skills for handling both the explicit and implied intents, which target is estimated to become available within the explicit and implied customer patience threshold period. In the example where the explicit intent patience value is 2 minutes and the implied intent patience value is 30 seconds, the server 25 attempts to find an agent who is expected to become available in 30 seconds in order to handle both the explicit and implied intents. The determination of agent availability may be made according to conventional mechanisms based on, for example, agent availability data provided by the statistics server 22.

If an agent is identified who is capable of meeting the explicit and implied customer patience thresholds, the current interaction is delivered to the identified agent in step 516. For example, the customer experience server 25 may transmit to the routing server 20 a command to route the interaction to the identified agent. The command may be accompanied with the identified explicit and implied intents for the interaction.

In step 518, the server 25 prompts the agent to address both the explicit and implied intents. The prompt may be merely displaying the identified intents of the interaction. If the intent is an implied intent, the intent may be highlighted or otherwise distinguished from the explicit intent. According to one embodiment, the agent may be coached to handle the implied intent via scripts displayed on the agent device. In this manner, the implied intents are handled under the right circumstances when there are resources available to handle the implied intents for maximizing the results of such implied intents.

Referring again to act 514, if the interaction cannot be routed to an agent in the eligible routing groups within the identified customer patience times, a determination is made in act 522 as to whether there are available agents with skills for handling the explicit intent that satisfy the explicit customer patience threshold.

If the answer is YES, the server 25 drops the implied intent and/or stores the implied intent for future use, and the interaction is delivered to the identified agent for handling the explicit intent in act 526. In this regard, the command to route the interaction to the identified agent may include the identified explicit intent while excluding the identified implied intent. According to one embodiment, missed opportunities may be reported and analyzed. Such missed opportunities may relate to loss of revenue and sales due to lack of resources for handling the implied intent.

If no agent is available for handling the explicit intent within the explicit customer patience threshold, the customer experience server 25 may transmit a message to the routing server 20 to employ default routing logic for routing the interaction according to conventional routing mechanisms in act 528. This may include, for example, transmitting a message to the customer promising a call-back if the customer does not want to wait for an available agent. The generated eligible routing groups may also be dissolved for routing the call to any available agent even if such agent does not satisfy the minimum performance requirement calculated for the explicit intent.

After an interaction has been handled by an agent, results of the interaction are collected by, for example, the server 25 for updating, in act 520, the various databases in the mass storage device 30. The results may include a customer's response to questions or survey related to the interaction, data relating to contact center statistics (e.g. average handle time, wait time, etc.), business result data (e.g. whether a sale was made and details on the sale), and the like. By updating the data to reflect ongoing performance of the agent and the contact center, the data may then be used to re-assess the requirements for the next interaction.

In the flow diagram of FIGS. 5A-5B, implied intents are addressed in a reactive event in response to the customer initiating an inbound interaction. Implied intents may also be handled as a proactive event that does not have, as a prerequisite, an inbound customer interaction. For example, an implied intent may be proactively executed based on opportunities triggered by an event generated by a customer falling short of an express request for communication, such as, for example, a customer visiting the company's web site, logging into a mobile application provided by the company, visiting a company branch/store, paying a bill, and the like. In this case, the customer is identified as being contactable with an offer, and an invitation to discuss the implied intent may be generated and transmitted via any interaction channel. The invitation may be part of, for example, and outbound campaign of the contact center. Consideration of the timing of, and resources allocated to, the proactive events may be similar to the considerations discussed in FIGS. 5A-5B with respect to the reactive events. According to one embodiment, interaction results from proactive events may include data on preferred mode of contact and performance of contact methods for future generation and prioritization.

FIGS. 6-9F are conceptual layout diagrams of exemplary goals that an administrator may set for different goal levels according to one embodiment of the invention. The goals may be updated periodically, such as, for example, on an hourly, daily, or monthly basis. The goals may be stored, for example, in the buffer memory of the server 25 and compared against current contact center performance to identify performance gaps, forecast and schedule resources, plan and adjust organizational goals, and the like.

As exemplified in the diagrams of FIGS. 6-9F, goals are set at multiple levels, with each higher level defaulting to the lower grouping unless overridden. Exemplary levels shown in the diagrams of FIGS. 6-9F include:

Global Settings
Intention Group Settings, e.g. SALES
   Product Line or Business Unit Settings, e.g. Mobile
     Intention Settings, e.g. New Sale, Re-contract
   Intention Group Settings, e.g. SALES
     Product Line or Business Unit Settings, e.g. Broadband
       Intention Settings, e.g. New Sale, Re-contract
   Intention Group Settings, e.g. SERVICE
     Product Line or Business Unit Settings, e.g. Broadband
       Intention Settings, e.g. Connectivity
   Intention Group Settings, e.g. SERVICE
     Product Line or Business Unit Settings, e.g. Broadband
       Intention Settings, e.g. Fault At a global level and with the ability to override at each subsequent level, the following types of settings may be made:

1) Goals to be achieved, and the associated timeframe (e.g. Monthly Revenue and NPS Targets); and 2) Channels of operation and their modes of operation (e.g. Voice, Chat, Reactive, Proactive).

Other goals include but not limited to conversion rates, offers made, and the like.

According to one embodiment, goal setting includes a validation step that is executed by, for example, the configuration server, to ensure that the values at each level make sense. For example, the validation step may check to ensure that revenue numbers are not more than the sum of the underlying numbers rolled-up.

In the course of operation, the actual values achieved as well as the opportunities generated and executed and not executed may be tracked by the customer experience server 25, reporting server 28, or a separate monitoring server, and reported on. For example the number of "mobile sales" implied intents generated for a period may be tracked. These may be seen as "opportunities" that support meeting goals. The number of implied intents that were executed, how they were executed (e.g. reactive, event driven, proactive), and the channel of execution may also be tracked. The reason for non-execution may also be tracked, such as, for example, No Resource Available, Exceeded Patience, Missed due to Value Prioritization, No Opportunity to Execute, and the like.

According to one embodiment, the reporting/analysis may be used to highlight contact center performance against set goals, and the likely reason for goals not being met (e.g. in a dashboard style reporting). The report/analysis data may also be used, post initial configuration, to pre-fill goals with interaction and opportunity volume information to support setting of realistic and achievable goals. For example if the combined number of intentions for mobile sales based on history (explicit+implied, reactive+proactive) for a period is 1000 at a revenue of $100, there would be no point in setting a revenue target of $1 M as the maximum revenue of the opportunities based on the above numbers is $100,000.

The analysis data may also be fed into the goal seeking component of routing, such as, for example, for calculating conversion rates required to meet a specific revenue target based on average sale value and performance to date.

A "missed opportunity" analysis may also be used for strategic capacity planning. For example, in regards to the "mobile sales" implied intent, assume the following:

1. 1000 implied intents were generated;
2. 600 were executed (200 as reactive tags, 200 event driven, and 200 full proactive);
3. 200 event driven opportunities were missed due to lack of capable resource; and
4. 200 full proactive contacts were not made due to resourcing.

In the above example, 400 opportunities would have been missed at $100 average revenue. This equates to $40,000 in missed opportunity. If the conversion rate is 25%, this would equate to $10,000 in missed sales.

Based on the above analysis, the contact center (e.g. a workforce management server) may be invoked to calculate an increased number of resources that could be enabled to be capable of meeting the demand in order to execute on the opportunity. This principle may be rolled up and provided at each level of the goal setting/seeking to enable true strategic workforce and capacity planning across all interactions and channels.

Each of the various servers, controllers, switches, gateways, engines, and/or modules (collectively referred to as servers) in the afore-described figures may be a process or thread, running on one or more processors, in one or more computing devices 1500 (e.g., FIG. 10A, FIG. 10B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 10A:
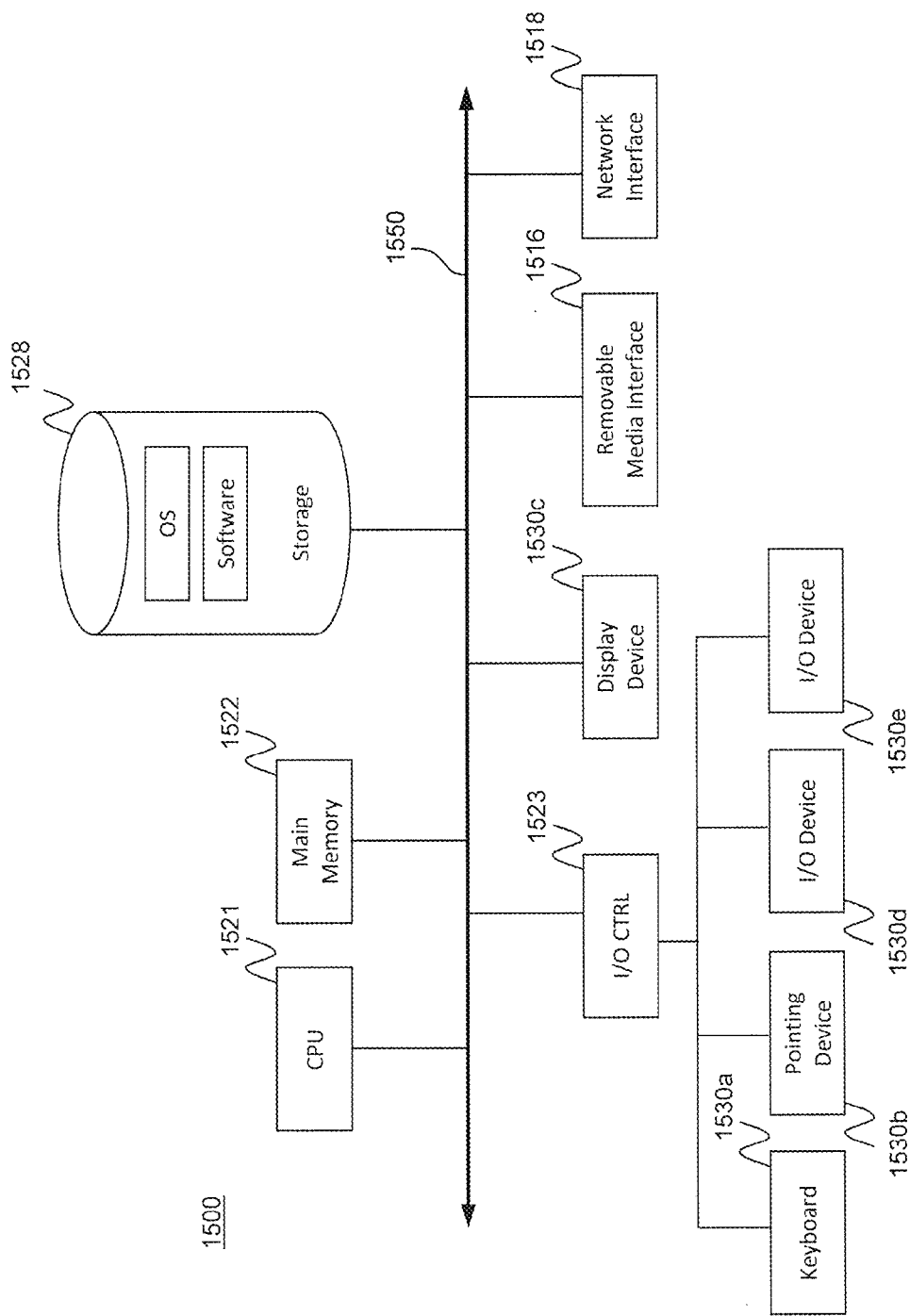
FIG. 10A is a block diagram of a computing device according to an embodiment of the present invention.
Figure 10B:
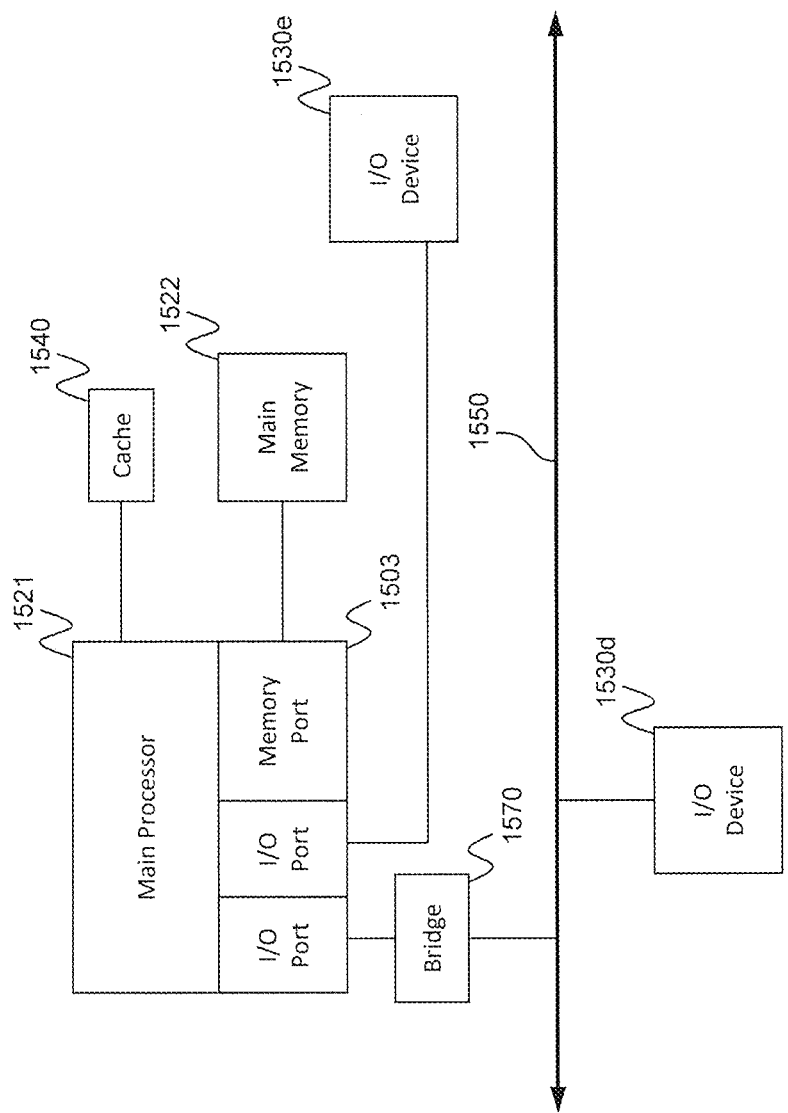
FIG. 10B is a block diagram of a computing device according to an embodiment of the present invention.

FIG. 10A and FIG. 10B depict block diagrams of a computing device 1500 as may be employed in exemplary embodiments of the present invention. Each computing device 1500 includes a central processing unit 1521 and a main memory unit 1522. As shown in FIG. 10A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 10B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 10A, the central processing unit 1521 communicates with the main memory 1522 via a system bus 1550. As shown in FIG. 10B, the central processing unit 1521 may also communicate directly with the main memory 1522 via a memory port 1503.

FIG. 10B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 10A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 10B depicts an embodiment of a computer 1500 in which the central processing unit 1521 communicates directly with I/O device 1530e. FIG. 10B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 10A, may control the I/O devices. The I/O controller may control one or more I/O devices such as a keyboard 1530a and a pointing device 1530b, e.g., a mouse or optical pen.

Referring again to FIG. 10A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 10A and FIG. 10B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 10D:
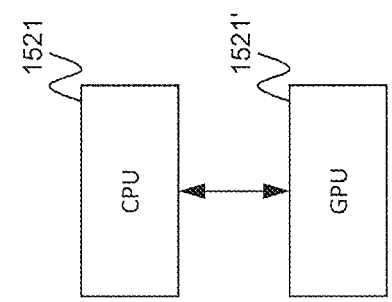
FIG. 10D is a block diagram of a computing device according to an embodiment of the present invention.
Figure 10C:
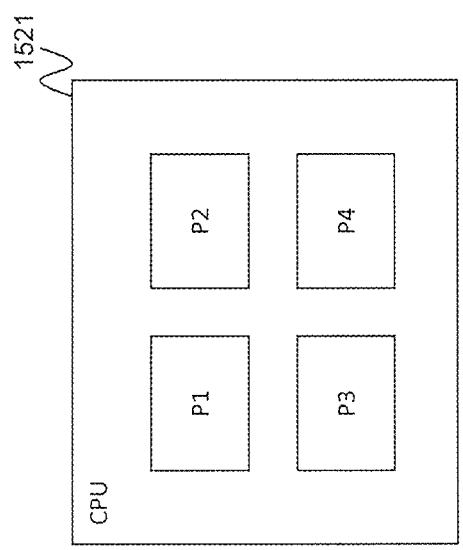
FIG. 10C is a block diagram of a computing device according to an embodiment of the present invention.

As shown in FIG. 10C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 10D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 10E:
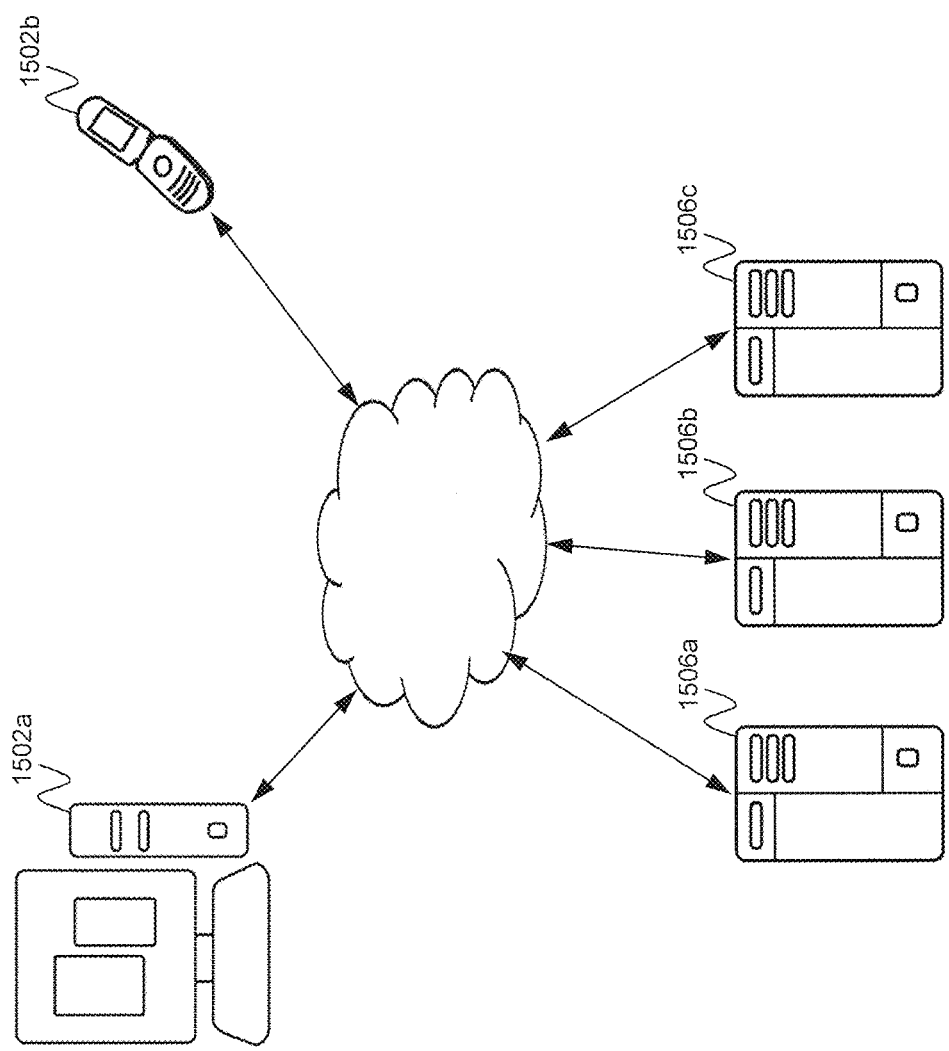
FIG. 10E is a block diagram of a network environment including several computing devices according to an embodiment of the present invention.

A computing device may be one of a plurality of machines connected by a network, or it may comprise a plurality of machines so connected. FIG. 10E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 10E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

It is the Applicant's intention to cover by claims all such uses of the invention and those changes and modifications which could be made to the embodiments of the invention herein chosen for the purpose of disclosure without departing from the spirit and scope of the invention. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A method for managing an interaction for a contact center, the method comprising:
   identifying, by a processor, an intent for an interaction between a customer and the contact center;
   identifying, by the processor, a goal related to the intent;
   determining, by the processor, contact center performance in achieving the goal;
   comparing, by the processor, the contact center performance to the goal;
   determining, by the processor, based on the comparing, whether the contact center is over-performing or under-performing relative to the goal;
   determining, by the processor, performance of contact center targets in handling the intent;
   identifying, by the processor, a particular target selected from the contact center targets based on the determined performance of the contact center targets and the determination as to whether the contact center is over-performing or under-performing relative to the goal; and
   delivering, by an electronic switch coupled to the processor, the interaction to the particular target.

2. The method of claim 1, wherein the determining the performance of the contact center targets includes:
   identifying, by the processor, first and second contact center metrics identified as being correlated to each other; and
   calculating, by the processor, a performance score for each of the plurality of contact center targets, wherein the calculating is based on historical performance of the corresponding target for the intent in regards to the first and second contact center metrics.

3. The method of claim 2, wherein the identifying of the particular target includes:
   identifying a minimum performance score; and
   selecting a contact center target with a performance score satisfying the minimum performance score.

4. The method of claim 3, wherein the minimum performance score is based on an amount in which the contact center is over-performing or under-performing relative to the goal.

5. A method for managing an interaction for a contact center, the method comprising:
   identifying, by a processor, first and second type of intents for an interaction between a customer and the contact center, wherein the first type of intent is expressly identified by the customer, and the second type of intent is derived by the processor based on data accumulated on the customer;
   identifying, by the processor, first and second goals related to respectively the first and second types of intents;
   determining, by the processor, contact center performance in achieving the first and second goals;
   comparing, by the processor, the contact center performance to the first and second goals;
   determining, by the processor, based on the comparing, whether the contact center is over-performing or under-performing relative to the first and second goals;
   determining, by the processor, performance of a plurality of first contact center targets and performance of a plurality of second contact center targets in handling respectively the first and second types of intents;
   identifying, by the processor, a particular target selected from the plurality of first and second contact center targets based on the determined performance of the plurality of first and second contact center targets and the determination as to whether the contact center is over-performing or under-performing relative to the first and second goals;
   delivering, by an electronic switch coupled to the processor, the interaction to the particular target; and
   prompting, by the processor, the particular target to address both the first and second types of intents during the interaction.

6. The method of claim 5, wherein the first type of intent identifies a reason for the customer initiating the interaction.

7. The method of claim 5, wherein the second type of intent is related to an opportunity for the contact center in achieving the second contact goal.

8. The method of claim 5, wherein the first or second goal relates to at least one of revenue or customer experience.

9. The method of claim 5, wherein the determining the performance of the plurality of first contact center targets and the performance of the plurality of second contact center targets further includes:
   identifying, by the processor, first and second contact center metrics identified as being correlated to each other;
   calculating, by the processor, a first performance score for each of the plurality of first contact center targets, wherein the calculating is based on historical performance of the corresponding first contact center target for the first type of intent in regards to the first and second contact center metrics; and
   calculating, by the processor, a second performance score for each of the plurality of second contact center targets, wherein the calculating is based on historical performance of the corresponding second contact center target for the second type of intent in regards to the first and second contact center metrics.

10. The method of claim 9, wherein the identifying of the particular target includes:
    identifying a minimum performance score; and
    selecting a contact center target with a performance score satisfying the minimum performance score.

11. The method of claim 10, wherein the minimum performance score is based on an amount in which the contact center is over-performing or under-performing relative to the goal related to the corresponding type of intent.

12. The method of claim 10, wherein the minimum performance score is based on interactions forecasted for the corresponding type of intent.

13. The method of claim 5 further comprising determining availability of the particular target, wherein the determining the availability of the particular target includes:
    determining, by the processor, first and second customer patience measures relating respectively to the first and second type of intents; and determining, by the processor, whether the interaction may be delivered to the particular target within limits of the first and second customer patience measures, wherein the processor delivers the interaction to the particular target in response to determining that the interaction may be delivered within the limits of the first and second customer patience measures.

14. The method of claim 13, wherein the second customer patience measure is shorter than the first customer patience measure.

15. The method of claim 5, wherein the identifying the second type of intent includes:
   identifying, by the processor, a plurality of implied intents for the customer associated with one or more contact center business goals;
   prioritizing, by the processor, the plurality of implied intents; and
   selecting, by the processor, one of the plurality of implied intents based on the prioritizing.

16. The method of claim 15, wherein the implied intents are prioritized based on contact center performance in achieving the one or more contact center business goals.

17. The method of claim 5, wherein the each of the first and second contact center targets is a group of agents.

18. A system for managing an interaction for a contact center, the method comprising:
   a processor; and
   a memory, wherein the memory stores instructions that, when executed by the processor, cause the processor to:
      identify first and second type of intents for an interaction between a customer and the contact center, wherein the first type of intent is expressly identified by the customer, and the second type of intent is derived by the processor based on data accumulated on the customer;
      identify first and second goals related to respectively the first and second types of intents;
      determine contact center performance in achieving the first and second goals;
      comparing, by the processor, the contact center performance to the first and second goals;
      determining, by the processor, based on the comparing, whether the contact center is over-performing or under-performing relative to the first and second goals;
      determine performance of a plurality of first contact center targets and performance a plurality of second contact center targets in handling respectively the first and second types of intents;
      identify a particular target selected from the plurality of first and second contact center target based on the determined performance of the plurality of first and second contact center targets and the determination as to whether the contact center is over-performing or under-performing relative to the first and second goals;
      prompt the particular target to address both the first and second types of intents during the interaction; and
   an electronic switch coupled to the processor, the electronic switch being configured to deliver the interaction to the particular target.

19. The system of claim 18, wherein the first type of intent identifies a reason for the customer initiating the interaction.

20. The system of claim 18, wherein the second type of intent is related to an opportunity for the contact center in achieving the second goal.

21. The system of claim 18, wherein the first or second goal relates to at least one of revenue or customer experience.

22. The system of claim 18, wherein the instructions that cause the processor to determine the performance of the plurality of first contact center targets and the performance of the plurality of second contact center targets, further include instructions that cause the processor to:
   identify first and second contact center metrics identified as being correlated to each other;
   calculate a first performance score for each of the plurality of first contact center targets, wherein the calculating is based on historical performance of the corresponding first contact center target for the first type of intent in regards to the first and second contact center metrics; and
   calculate a second performance score for each of the plurality of second contact center targets, wherein the calculating is based on historical performance of the corresponding second contact center target for the second type of intent in regards to the first and second contact center metrics.

23. The system of claim 22, wherein the instructions that cause the processor to identify the particular target further include instructions that cause the processor to:
   identify a minimum performance score; and
   select a contact center target with a performance score satisfying the minimum performance score.

24. The system of claim 23, wherein the minimum performance score is based on an amount in which the contact center is over-performing or under-performing relative to the goal related to the corresponding type of intent.

25. The system of claim 23, wherein the minimum performance score is based on interactions forecasted for the corresponding type of intent.

26. The system of claim 18, wherein the instructions further cause the processor to determine the availability of the particular target, wherein the instructions that cause the processor to determine the availability of the particular target include instructions that cause the processor to:
   determine first and second customer patience measures relating respectively to the first and second type of intents; and
   determine whether the interaction may be delivered to the particular target within limits of the first and second customer patience measures, wherein the instructions further cause the processor to deliver the interaction to the particular target in response to determining that the interaction may be delivered within the limits of the first and second customer patience measures.

27. The system of claim 26, wherein the second customer patience measure is shorter than the first customer patience measure.

28. The system of claim 18, wherein the instructions that cause the processor to identify the second type of intent include instructions that cause the processor to:
   identify a plurality of implied intents for the customer associated with one or more contact center business goals;
   prioritize the plurality of implied intents; and
   select one of the plurality of implied intents based on the prioritizing.

29. The system of claim 28, wherein the implied intents are prioritized based on contact center performance in achieving the one or more contact center business goals.

30. The system of claim 18, wherein the each of the first and second contact center targets is a group of agents.

31. A system for managing an interaction for a contact center, the system comprising:
a processor; and
a memory, wherein the memory stores instructions that, when executed by the processor, cause the processor to:
identify an intent for an interaction between a customer and the contact center;
identify a goal related to the intent;
determine contact center performance in achieving the goal;
compare the contact center performance to the goal;
determine, based on the comparing, whether the contact center is over-performing or under-performing relative to the goal;
determine performance of contact center targets in handling the intent;
identify a particular target selected from the contact center targets based on the determined performance of the contact center targets and the determination as to whether the contact center is over-performing or under-performing relative to the goal; and
an electronic switch coupled to the processor, wherein the electronic switch is configured to deliver the interaction to the particular target.

32. The system of claim 31, wherein the instructions that cause the processor to determine the performance of the contact center targets include instructions that cause the processor to:
identify first and second contact center metrics identified as being correlated to each other; and
calculate a performance score for each of the plurality of contact center targets, wherein the calculating is based on historical performance of the corresponding target for the intent in regards to the first and second contact center metrics.

33. The system of claim 32, wherein the instructions that cause the processor to identify the particular target include instructions that cause the processor to:
identify a minimum performance score; and
select a contact center target with a performance score satisfying the minimum performance score.

34. The system of claim 33, wherein the minimum performance score is based on an amount in which the contact center is over-performing or under-performing relative to the goal.

* * * * *